United States Patent
Yamamoto et al.

(10) Patent No.: US 9,789,694 B2
(45) Date of Patent: Oct. 17, 2017

(54) INK JET RECORDING METHOD AND INK JET RECORDING APPARATUS

(71) Applicant: CANON KABUSHIKI KAISHA, Tokyo (JP)

(72) Inventors: Masashi Yamamoto, Tokyo (JP); Tomohiro Yamashita, Yokohama (JP); Soichi Nagai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/170,167

(22) Filed: Jun. 1, 2016

(65) Prior Publication Data

US 2016/0355020 A1    Dec. 8, 2016

(30) Foreign Application Priority Data

Jun. 4, 2015    (JP) .................................. 2015-114030
Jun. 4, 2015    (JP) .................................. 2015-114032

(51) Int. Cl.
*C09D 11/322*    (2014.01)
*B41J 2/175*    (2006.01)
*C09D 11/037*    (2014.01)

(52) U.S. Cl.
CPC ......... *B41J 2/17513* (2013.01); *C09D 11/037* (2013.01); *C09D 11/322* (2013.01)

(58) Field of Classification Search
CPC .. B41J 2/17513; C09D 11/322; C09D 11/037; C09D 11/30; C09D 11/033
See application file for complete search history.

(56) References Cited

U.S. PATENT DOCUMENTS

| | | | | |
|---|---|---|---|---|
| 5,938,827 A | * | 8/1999 | Breton | C09D 11/328 106/31.43 |
| 5,963,237 A | * | 10/1999 | Ikkatai | B41J 2/1652 347/85 |
| 2014/0251179 A1 | * | 9/2014 | Liu | C08K 13/06 106/31.86 |
| 2014/0364548 A1 | * | 12/2014 | Everhardus | C09D 11/322 524/166 |

FOREIGN PATENT DOCUMENTS

| | | |
|---|---|---|
| JP | 2004-083621 A | 3/2004 |
| JP | 2009-256599 A | 11/2009 |

OTHER PUBLICATIONS

STN-CAS Registry Record 26850-24-8, Nov. 16, 1984.*

* cited by examiner

*Primary Examiner* — Julian Huffman
*Assistant Examiner* — Michael Konczal
(74) *Attorney, Agent, or Firm* — Canon U.S.A., Inc. IP Division (57) ABSTRACT

An ink jet recording method comprising ejecting an ink from a recording head to record an image on a recording medium using an ink jet recording apparatus. The ink jet recording apparatus includes a main tank, a sub tank, and a recording head. The ratio of the maximum ink storage amount of the main tank to the maximum ink storage amount of the sub tank is 3.0 or more to 50.0 or less. The ink contains a pigment and a particular water-soluble organic solvent. The ratio of the water-soluble organic solvent content to the pigment content is 2.0 or more to 10.0 or less. The ink has a temperature at which the ratio of the viscosity of the ink in the recording head to the viscosity of the ink at a temperature of 25° C. is 0.8 or less.

21 Claims, 2 Drawing Sheets

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

Ink jet recording methods enable recording on various recording media. Various inks, for example, inks suitable for recording images of photographic quality on glossy paper and inks suitable for recording documents on plain paper, have been proposed for each use to improve image quality.

Ink jet recording methods have also been utilized to record business documents including text and graphics on plain paper and are becoming increasingly useful in such applications. With advances in ink jet recording methods, there are demands for improved durability and reliability in long-term use and for higher productivity with an increased number of recorded documents. In order to satisfy such demands, a particular water-soluble organic solvent is added to an ink so as to improve intermittent ejection stability in various temperature and humidity environments (see Japanese Patent Laid-Open No. 2009-256599).

In order to increase productivity, the present inventors tried to increase the main tank capacity in an ink jet recording apparatus that includes a main tank as a main ink storage portion and a sub tank. It was confirmed that the addition of a particular water-soluble organic solvent described in Japanese Patent Laid-Open No. 2009-256599 to an ink tended to improve intermittent ejection stability and reliability. However, recording involving ejection of an ink containing a pigment for extended periods using a recording apparatus including a large main tank tended to cause gradually degraded image quality. Such degradation was not prevented with an ink described in Japanese Patent Laid-Open No. 2009-256599.

SUMMARY OF THE INVENTION

An ink jet recording method according to the present invention is an ink jet recording method comprising ejecting an aqueous ink from a recording head to record an image on a recording medium using an ink jet recording apparatus. The ink jet recording apparatus includes a first ink storage portion, a second ink storage portion, and a recording head. The first ink storage portion has a maximum ink storage amount ($V_1$) 3.0 or more to 50.0 or less times larger than the maximum ink storage amount ($V_2$) of the second ink storage portion. The aqueous ink contains a pigment and a first water-soluble organic solvent having a relative dielectric constant of 10.0 or more to 30.0 or less at a temperature of 25° C., and a first water-soluble organic solvent content S (% by mass) is 2.0 or more to 10.0 or less times higher than a pigment content P (% by mass). During ejection, the aqueous ink has a temperature at which the ratio of the viscosity of the aqueous ink in the recording head ($\eta_B$) to the viscosity of the aqueous ink at a temperature of 25° C. ($\eta_A$) is 0.8 or less.

Further features of the present invention will become apparent from the following description of examples with reference to the attached drawings.

DESCRIPTION OF THE EMBODIMENTS

The present invention will be further described in the following preferred embodiments. Aqueous ink jet inks are hereinafter also referred to simply as "inks", the first ink storage portion is hereinafter also referred to as a "main tank", and the second ink storage portion is hereinafter also referred to as a "sub tank". Unless otherwise specified, the physical properties other than viscosity are determined at normal temperature (25° C.).

The present inventors investigated the cause of degraded image quality during ink ejection for extended periods using an ink jet recording apparatus having an increased main tank capacity. It was found that evaporation of water from ink through an ejection port of a recording head results in a concentration of the other components and results in an increased concentration of pigment in the ink near the ejection port. This destabilizes pigment dispersion, causes pigment aggregation, impedes normal ink ejection, and causes degraded image quality. This is a problem related to intermittent ejection stability, as described in Japanese Patent Laid-Open No. 2009-256599. It is known that the decrease in intermittent ejection stability can be reduced by adding a water-soluble organic solvent to the ink, the water-soluble organic solvent being likely to make the dispersion of a coloring material unstable. Upon evaporation of water, the water-soluble organic solvent diffuses the coloring material near the ejection port deep into a nozzle.

The present inventors observed an ejection port of an ink jet recording apparatus having a large main tank capacity over time after an ink containing a pigment and a water-soluble organic solvent having a low affinity for the pigment was ejected from a recording head of the ink jet recording apparatus. When the recording apparatus had a short service period and a small cumulative number of ejections, the water-soluble organic solvent diffused the pigment deep into a nozzle.

In contrast, when the recording apparatus was used for extended periods and had a large cumulative number of ejections, the water-soluble organic solvent having a low affinity for the pigment did not diffuse the pigment deep into the nozzle. Further investigation showed that after the recording apparatus was used for extended periods, the concentration of pigment in the ink in the nozzle became higher than the concentration level resulting from water evaporation. The present inventors investigated the cause for this and found the following. An increase in main tank capacity extends the service life of the recording apparatus without replacement of the ink tank. Thus, as the pigment in the ink in the main tank gradually precipitated, the concentration of pigment in the ink supplied to the recording head increased.

Considering such a reason, the decrease in intermittent ejection stability after the use of the recording apparatus for extended periods can be partly reduced by suppressing the increase in the concentration of pigment in the ink supplied from the main tank to the downstream sub tank and recording head. Thus, studies by the present inventors led to the development of a solution wherein the maximum ink storage amount $V_1$ (mL) of the main tank is 3.0 or more to 50.0 or less times the maximum ink storage amount $V_2$ (mL) of the sub tank.

An ink is supplied from the main tank to the recording head through the sub tank. An ink flow from the main tank and an ink flow to the recording head occur in the sub tank.

Thus, the ink is more agitated in the sub tank than in the main tank, and the pigment is less likely to precipitate in the sub tank. In the present invention, a certain capacity ratio of the main tank to the sub tank causes agitation of ink in the sub tank and thereby reduces the increase in pigment concentration resulting from sedimentation. This allows the water-soluble organic solvent having a low affinity for the pigment to diffuse the pigment deep into the nozzle and reduce the decrease in intermittent ejection stability to some extent.

A capacity ratio of less than 3.0 results in a decrease in ink agitation efficiency and intermittent ejection stability due to an excessively large maximum ink storage amount of the sub tank. A capacity ratio of more than 50.0 results in a decrease in intermittent ejection stability because, due to an excessively small maximum ink storage amount of the sub tank, an ink is supplied to the recording head before the ink is sufficiently agitated.

On the basis of further study results, the present inventors found that with a different tank capacity ratio, a first water-soluble organic solvent having a relative dielectric constant of 10.0 or more to 30.0 or less at a temperature of 25° C. is useful as a water-soluble organic solvent having a low affinity for pigment. Pigment in aqueous ink is dispersed by the action of electrostatic repulsion of ionic groups and/or affinity of a nonionic group for water. Thus, the relative dielectric constant can be utilized as an indicator of a low affinity of a water-soluble organic solvent for pigment. A water-soluble organic solvent having a low relative dielectric constant characteristically makes pigment dispersion unstable and diffuses the pigment deep into the nozzle. Conversely, a water-soluble organic solvent having a high relative dielectric constant characteristically stabilizes pigment dispersion and rarely diffuses the pigment.

A water-soluble organic solvent having a relative dielectric constant of less than 10.0 makes pigment dispersion extremely unstable. Thus, when the viscosity of ink is decreased by heating, such a water-soluble organic solvent tends to cause pigment aggregation, does not diffuse pigment deep into the nozzle, and cannot reduce the decrease in intermittent ejection stability. A water-soluble organic solvent having a relative dielectric constant of 30.0 or less characteristically makes pigment dispersion moderately unstable, and can diffuse the pigment deep into the nozzle when the viscosity of ink is decreased by heating. In contrast, a water-soluble organic solvent having a relative dielectric constant of more than 30.0 cannot make pigment dispersion unstable, cannot diffuse the pigment deep into the nozzle, and therefore cannot reduce the decrease in intermittent ejection stability.

Furthermore, after the other components are concentrated by water evaporation, a first water-soluble organic solvent having a relative dielectric constant of 10.0 or more to 30.0 or less at a temperature of 25° C. should be present in a certain amount relative to pigment to be diffused. More specifically, the ratio of the first water-soluble organic solvent content S (% by mass) to the pigment content P (% by mass) is 2.0 or more to 10.0 or less. A mass ratio of 2.0 or more results in the diffusion of pigment deep into the nozzle when the viscosity of ink is decreased by heating. In contrast, a mass ratio of less than 2.0 results in an excessively low first water-soluble organic solvent content in relation to the pigment content. Thus, the first water-soluble organic solvent cannot diffuse the pigment deep into the nozzle and cannot reduce the decrease in intermittent ejection stability. A mass ratio of more than 10.0 results in an excessively high first water-soluble organic solvent content in relation to the pigment content. Thus, upon evaporation of water from an ejection port, such a water-soluble organic solvent tends to cause pigment aggregation, cannot diffuse the pigment deep into the nozzle, and cannot reduce the decrease in intermittent ejection stability.

As described above, in the present invention, the capacity ratio of the main tank to the sub tank is 3.0 or more to 50.0 or less, and a first water-soluble organic solvent having a relative dielectric constant of 10.0 or more to 30.0 or less at a temperature of 25° C. is used. This allows a water-soluble organic solvent having a low affinity for pigment to diffuse pigment deep into the nozzle and reduce the decrease in intermittent ejection stability to some extent. However, if sedimentation increases the pigment concentration in conjunction with aggregation of pigment, the decrease in intermittent ejection stability is insufficiently reduced. Thus, the desired effects cannot be produced only by setting the capacity ratio in the range described above and by using a first water-soluble organic solvent having a relative dielectric constant of 10.0 or more to 30.0 or less at a temperature of 25° C.

In an ink having a high pigment concentration resulting from sedimentation, pigment particles come closer due to hydrophobic interaction and tend to aggregate. Because of high bond strength therebetween, pigment particles have limited mobility. Thus, even in the presence of a water-soluble organic solvent having a low affinity for the pigment, the pigment is difficult to diffuse deep into the nozzle and remains near an ejection port. Thus, prevention of pigment aggregation is also effective in an ink having a high pigment concentration resulting from sedimentation. Thus, a method for preventing pigment aggregation has been studied. More specifically, the present inventors studied a method for decreasing the viscosity of ink to facilitate the movement of pigment particles and weakening apparent interaction between the pigment particles.

The present inventors have reached a conclusion that it is effective to set the capacity ratio as described above, to add a water-soluble organic solvent having a low affinity for pigment to ink, and to decrease the viscosity of the ink by heating so as to cause rapid Brownian movement of pigment particles. Thus, in the present invention, the temperature of ink is adjusted to a temperature $T_B$ (° C.) ($T_B$>25° C.) at which the ratio of the viscosity $\eta_B$ (mPa·s) of the ink in a recording head to the viscosity $\eta_A$ (mPa·s) of the ink at a temperature of 25° C. is 0.8 or less. It was found that a water-soluble organic solvent having a low affinity for pigment can effectively diffuse the pigment deep into a nozzle at a ratio $\eta_B/\eta_A$ of 0.8 or less.

Thus, in the present invention, the main tank and the sub tank have a high capacity ratio, a water-soluble organic solvent having a low affinity for pigment is added to an ink, and the viscosity of the ink is decreased by heating. Satisfying all these requirements can reduce the decrease in intermittent ejection stability particularly resulting from sedimentation of pigment.

An ink jet recording method according to the present invention, as well as an ink jet recording apparatus, a recording head, and an aqueous ink that can be suitably used in an ink jet recording method according to the present invention will be described below.

<General Structure of Ink Jet Recording Apparatus>

An ink jet recording method according to the present invention is an ink jet recording method for ejecting an aqueous ink from a recording head to record an image on a recording medium by using an ink jet recording apparatus that includes a first ink storage portion, a second ink storage portion, and a recording head. The first ink storage portion has a maximum ink storage amount $V_1$ (mL) 3.0 or more to 50.0 or less times larger than the maximum ink storage amount $V_2$ (mL) of the second ink storage portion. The aqueous ink contains a pigment and a first water-soluble organic solvent having a relative dielectric constant of 10.0 or more to 30.0 or less at a temperature of 25° C., and the first water-soluble organic solvent content S (% by mass) is 2.0 or more to 10.0 or less times higher than the pigment content P (% by mass). Furthermore, the temperature of aqueous ink is adjusted to a temperature $T_B$ (° C.) ($T_B$>25° C.) at which the ratio of the viscosity $\eta_B$ (mPa·s) of the aqueous ink in a recording head to the viscosity $\eta_A$ (mPa·s) of the aqueous ink at a temperature of 25° C. is 0.8 or less. An ink jet recording method according to the present invention and an ink jet recording apparatus for use in the ink jet recording method will be described in detail below with reference to the accompanying drawings.

Figure 1:
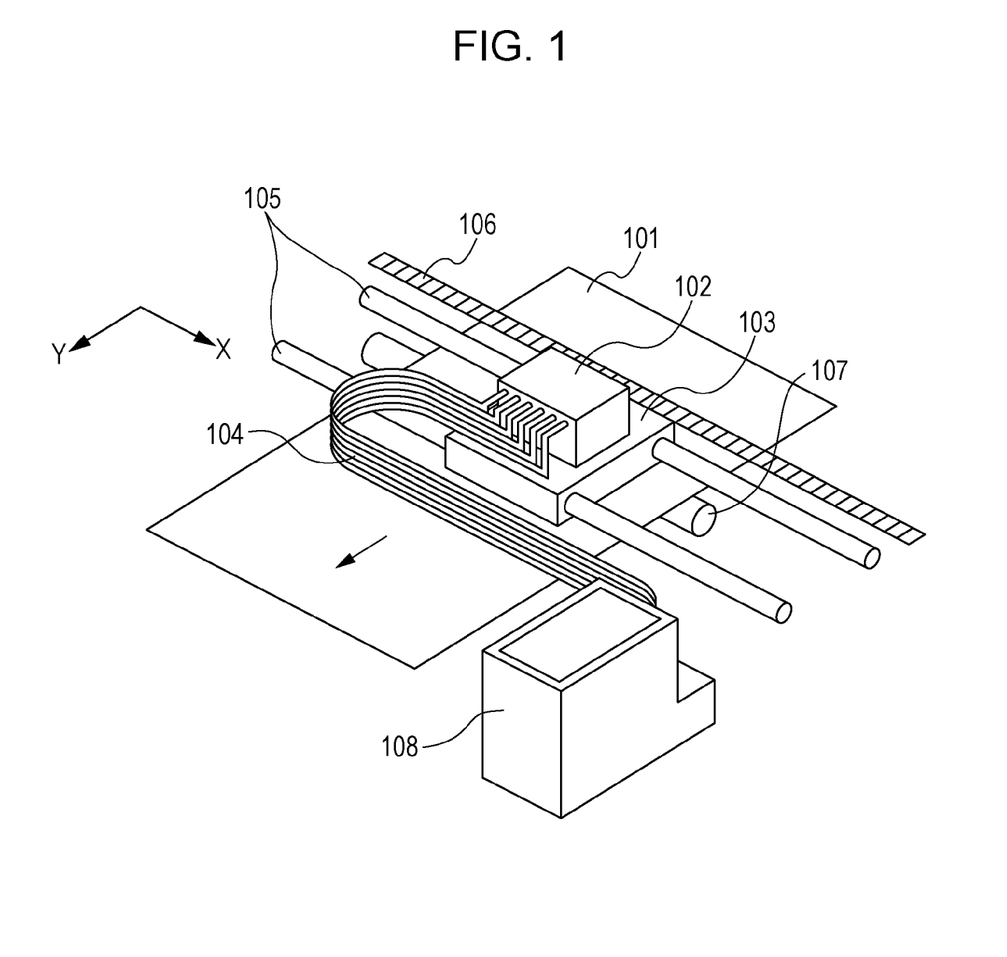
FIG. 1 is a schematic perspective view of an ink jet recording apparatus according to an embodiment of the present invention.

FIG. 1 is a schematic perspective view of an ink jet recording apparatus according to an embodiment of the present invention. The ink jet recording apparatus is of a serial type. In the recording operation, a recording head of the ink jet recording apparatus is reciprocally scanned in the X direction (main scanning direction). A recording medium 101 is intermittently conveyed in the Y direction (sub-scanning direction) by a conveying roller 107. The recording medium may be a recording medium having no coated layer, such as plain paper, or a recording medium having a coated layer, such as glossy paper or matte paper. A recording unit 102 on a carriage 103 is reciprocally scanned in the X direction (main scanning direction) perpendicular to the Y direction, which is the conveying direction of the recording medium 101. The recording operation is performed by a combination of the conveyance of the recording medium 101 in the Y direction and the reciprocal scanning of the recording unit 102 in the X direction.

Figure 2:
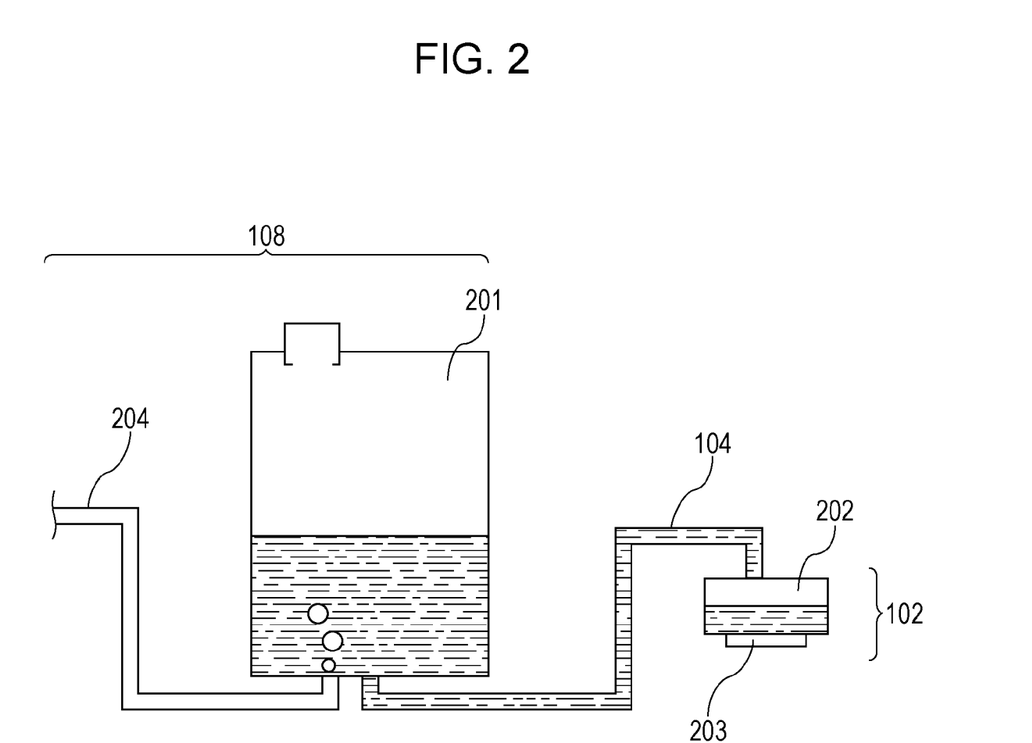
FIG. 2 is a schematic view of an ink supply system.

FIG. 2 is a schematic view of an ink supply system. As illustrated in FIG. 2, the recording unit 102 includes a recording head 203 of an inkjet type and a sub tank 202. The sub tank 202 is a second ink storage portion. An ink supplied is ejected from a plurality of ejection ports of the recording head 203. The recording unit 102 is disposed on the carriage 103, as illustrated in FIG. 1. The carriage 103 is movably supported by guide rails 105 along the X direction and is fixed to an endless belt 106 parallel to the guide rails 105. The endless belt 106 is reciprocated by the driving force of a motor. The reciprocating motion of the endless belt 106 causes reciprocal scanning of the carriage 103 in the X direction.

A main tank 201 is housed in a main tank storage portion 108 (FIG. 2). The main tank 201 is a first ink storage portion. The main tank 201 in the main tank storage portion 108 is coupled to the sub tank 202 of the recording unit 102 via an ink supply tube 104. In order to reduce variations in the diameter of the members through which the ink flows and thereby decrease the number of points at which bubbles are formed, the main tank 201 can be coupled to the sub tank 202 via the ink supply tube 104 alone. An ink is supplied from the main tank 201 to the sub tank 202 through the ink supply tube 104 and is ejected from the ejection ports of the recording head 203. The number of these members corresponds to the number of inks.

An ink (indicated by hatching) in the main tank 201 is supplied to the sub tank 202 through the ink supply tube 104 and is then supplied to the recording head 203. The main tank 201 is also coupled to a gas inlet tube 204, which serves as an air communication part. With the consumption of the ink by image recording, the ink in the main tank 201 is supplied to the sub tank 202 and decreases. As the ink in the main tank 201 decreases, air is introduced into the main tank 201 through the gas inlet tube 204. One end of the gas inlet tube 204 is opened to the air. Thus, the negative internal pressure for holding the ink in the ink supply system is maintained almost constant.

In the present invention, the maximum ink storage amount $V_1$ (mL) of the main tank 201 is 3.0 or more to 50.0 or less times, preferably 5.0 or more to 40.0 or less times, larger than the maximum ink storage amount $V_2$ (mL) of the sub tank 202.

The maximum ink storage amount $V_1$ (mL) of the main tank 201 can be increased to decrease the frequency of replacement of the tank or to increase the number of recorded media and thereby enhance productivity. More specifically, the maximum ink storage amount $V_1$ (mL) of the main tank 201 is preferably 60.0 mL or more to 200.0 mL or less, more preferably 60.0 mL or more to 150.0 mL or less. The initial loading of the ink in the main tank 201 is preferably approximately 95% or less of the maximum ink storage amount.

The maximum ink storage amount $V_2$ (mL) of the sub tank 202 can also be increased to decrease the frequency of ink supply from the main tank 201 or to stabilize the ink filling of the recording head 203. In an ink jet recording apparatus of a serial type, as illustrated in FIG. 1, however, the maximum ink storage amount $V_2$ (mL) of the sub tank 202 on the carriage 103 should not be excessively increased. An excessively large ink storage amount of the sub tank 202 requires an excessively large recording unit 102, thus resulting in a low movement speed of the carriage 103 or requiring a higher strength of the endless belt 106 or motor for moving the carriage 103. Thus, the maximum ink storage amount $V_2$ (mL) of the sub tank 202 is preferably 1.0 mL or more to 35.0 mL or less, more preferably 2.0 mL or more to 20.0 mL or less, particularly preferably 5.0 mL or more to 15.0 mL or less.

The first ink storage portion and the second ink storage portion (housing) can be formed of a thermoplastic resin, such as polyester, polycarbonate, polypropylene, polyethylene, polystyrene, or polyphenylene ether, a mixture thereof, or a modified thermoplastic resin. The housing may contain an ink absorbing member that can produce a negative pressure for holding ink. The ink absorbing member can be compressed fibers made of a resin, such as polypropylene or urethane. The housing may directly contain ink without the ink absorbing member.

In order to reduce the increase in the concentration of pigment in the ink at the bottom of the main tank 201 resulting from sedimentation of the pigment, the ratio (H/S) of the height H (cm) to the base area S (cm$^2$) of the main tank 201 is preferably 4.0 cm$^{-1}$ or less. When the ratio H/S is more than 4.0 cm$^{-1}$, heating of the ink and the addition of a first water-soluble organic solvent have a limited effect on diffusion of pigment, and the decrease in intermittent ejection stability during the use of the recording apparatus for extended periods may be insufficiently reduced. The ratio H/S is preferably 0.1 cm$^{-1}$ or more. For a ratio H/S of 0.1 cm$^{-1}$ or more to 4.0 cm$^{-1}$ or less, the aspect ratio of the bottom face of the main tank 201 depends on the size and location of the main tank storage portion 108 in the recording apparatus. The height and base area of the main tank 201 are the height and base area of the main tank 201 installed in the recording apparatus, and are not the outside dimensions of the housing but relate to a portion in which the ink is stored, that is, the internal volume. When the housing of the main tank 201 has a notch, the height and base area of the projected profile are employed.

The recording unit 102 illustrated in FIG. 2 includes the recording head 203 and the sub tank 202. A recording unit that is a head cartridge including a sub tank and a recording head may be mounted on the carriage. A recording unit including a sub tank and a recording head in an integrated manner may be mounted on the carriage. In the present invention, as illustrated in FIGS. 1 and 2, a recording unit in cartridge form including the sub tank 202, which is a second ink storage portion, and the recording head 203 in an integrated manner can be mounted on the carriage 103. In particular, the second ink storage portion or sub tank can be a housing made of a thermoplastic resin, and a recording element substrate including a recording head can be directly bonded to the sub tank without any member, such as a heat sink plate, interposed therebetween.

The ink ejection method of the recording head can utilize mechanical energy of a piezoelectric element or thermal energy of an electrothermal transducer. In the present invention, ink can be ejected by thermal energy.

In the present invention, the temperature of ink is adjusted to a temperature $T_B$ (° C.) ($T_B > 25$° C.) at which the ratio of the viscosity $\eta_B$ (mPa·s) of the ink in a recording head to the viscosity $\eta_A$ (mPa·s) of the ink at a temperature of 25° C. is 0.8 or less. In other words, an ink having a viscosity $\eta_B$ (mPa·s) at a temperature $T_B$ (° C.) of more than 25° C. and a viscosity $\eta_A$ (mPa·s) at normal temperature $T_A$ (25° C.) is ejected at the temperature $T_B$ (° C.) at which the ratio $\eta_B/\eta_A$ is 0.8 or less. More specifically, because the temperature $T_B$ is higher than the temperature $T_A$ (25° C.), the ink is ejected after the viscosity of the ink is decreased to some extent by heating. The viscosity ratio $\eta_B/\eta_A$ is preferably 0.4 or more. A viscosity ratio of less than 0.4, that is, a significant decrease in viscosity due to heating tends to result in excessive diffusion of pigment due to a water-soluble organic solvent having a low affinity for pigment. This results in no pigment at the nozzle tip and transparency. Ejection of such an ink may result in slightly poor image quality because the recording medium is not colored.

The ink may be heated by any method, provided that the ratio $\eta_B/\eta_A$ is 0.8 or less. For example, the ink can be heated by increasing the temperature of the recording head 203 with a heating unit, such as a heater, disposed outside or inside the recording head 203. The ink can be heated with a heating unit, such as a heater, disposed inside or outside at least one of the main tank 201 and the sub tank 202, particularly outside or inside the sub tank 202. In order to reduce the decrease in the temperature of the ink supplied to the recording head 203 through the ink supply tube 104, these members can have thermal insulation properties. The ink can be heated with an electrothermal transducer of the recording head 203 provided for ink ejection. The ink may be heated by thermal energy that does not cause ejection. Alternatively, the ink may be heated by thermal energy that causes ejection, and the thermal energy may be utilized to heat the ink in the sub tank 202.

In the present invention, the main tank 201 does not necessarily have an ink heating unit, and the ink in the sub tank 202 can be heated. More specifically, in the sub tank 202, a housing made of a thermoplastic resin is directly bonded to a recording element substrate including the recording head 203 having an electrothermal transducer, without any member interposed therebetween. The electrothermal transducer can supply the ink in the sub tank 202 with thermal energy to heat the ink in the sub tank 202. The ink may be heated by thermal energy that does not cause ejection. Alternatively, the ink may be heated by thermal energy that causes ejection, and the thermal energy may be utilized to heat the ink in the sub tank 202.

The temperature of the heated ink, that is, the temperature $T_B$ (° C.) is not particularly limited, provided that the ratio $\eta_B/\eta_A$ is 0.8 or less. From the perspective of the reliability of the ink and recording head, the temperature $T_B$ (° C.) is preferably 30° C. or more to 90° C. or less, more preferably 35° C. or more to 75° C. or less, particularly preferably 40° C. or more to 70° C. or less. The temperature $T_B$ (° C.) can be determined so as to satisfy the ratio $\eta_B/\eta_A$ of 0.8 or less, on the basis of the temperature and viscosity data measured in advance for an ink to be used.

<Aqueous Ink>

In an ink jet recording method according to the present invention, an aqueous ink is ejected from ejection ports of a recording head to record an image on a recording medium. The aqueous ink contains a pigment and a first water-soluble organic solvent having a relative dielectric constant of 10.0 or more to 30.0 or less at a temperature of 25° C. The components of the aqueous ink will be described below.

Pigment

A pigment is used as a coloring material. The pigment content (% by mass) of the aqueous ink is preferably 0.1% or more to 15.0% or less by mass, more preferably 1.0% or more to 10.0% or less by mass, of the total mass of the ink.

The pigment can be dispersed by any method. For example, the pigment can be a resin-dispersed pigment dispersed with a resin dispersant, a pigment dispersed with a surfactant, or a microcapsule pigment at least part of which is coated with a resin. The pigment can be a self-dispersible pigment having a functional group including a hydrophilic group, such as an anionic group, on its surface, or a pigment having a polymer-containing organic group chemically bonded to its surface (a resin-bonded self-dispersible pigment). As a matter of course, pigments of different dispersion types can be used in combination.

In particular, the pigment can be a self-dispersible pigment. In a resin-dispersed pigment, a resin is disposed near the surface of pigment particles. Thus, when sedimentation of pigment increases the concentration of pigment in the ink at the bottom, thickening due to the resin may prevent heating of the ink and hinder a first water-soluble organic solvent from diffusing the pigment. A self-dispersible pigment rarely causes such thickening, and the decrease in intermittent ejection stability during the use of the recording apparatus for extended periods can be efficiently reduced. In a self-dispersible pigment subjected to surface oxidation treatment, the oxidation treatment forms a nonionic group on the surface of pigment particles in addition to an anionic group. Even when sedimentation increases the pigment concentration, the nonionic group prevents pigment particles from coming closer by hydrophobic interaction. This facilitates heating of the ink and the diffusion of pigment due to the first water-soluble organic solvent, thus particularly efficiently reducing the decrease in intermittent ejection stability during the use of the recording apparatus for extended periods.

The pigment may be of any type. Examples of the pigment include, but are not limited to, inorganic pigments, such as carbon black, and organic pigments, such as azo, phthalocyanine, quinacridone, isoindolinone, imidazolone, diketopyrrolopyrrole, and dioxazine. These pigments may be used alone or in combination as required.

First Water-Soluble Organic Solvent Having Relative Dielectric Constant of 10.0 or More to 30.0 or Less at Temperature of 25° C.

The aqueous ink contains a first water-soluble organic solvent having a relative dielectric constant of 10.0 or more to 30.0 or less at a temperature of 25° C.

The relative dielectric constant of the water-soluble organic solvent can be measured with a dielectric constant meter (for example, "BI-870" (trade name, manufactured by Brookhaven Instruments Corporation)) at a frequency of 1 kHz. The relative dielectric constant of a water-soluble organic solvent that is solid at a temperature of 25° C. is determined by measuring the relative dielectric constant of a 50% by mass aqueous solution of the water-soluble organic solvent and by calculation using the following formula (1). Although the term "water-soluble organic solvent" generally refers to liquid, the term in the present invention also includes a water-soluble organic solvent that is solid at a temperature of 25° C. (at normal temperature).

$$\epsilon_{sol} = 2\epsilon_{50\%} - \epsilon_{water} \qquad (1)$$

$\epsilon_{sol}$: The relative dielectric constant of a water-soluble organic solvent that is solid at 25° C.
$\epsilon_{50\%}$: The relative dielectric constant of a 50% by mass aqueous solution of the water-soluble organic solvent that is solid at 25° C.
$\epsilon_{water}$: The relative dielectric constant of water.

Examples of water-soluble organic solvents having a relative dielectric constant of 20.0 or more to 30.0 or less include, but are not limited to, 1,3-butanediol (30.0), 1,2-propanediol (28.8), 1,2,6-hexanetriol (28.5), 2-methyl-1,3-propanediol (28.3), 2-pyrrolidone (28.0), 1,5-pentanediol (27.0), 3-methyl-1,3-butanediol (24.0), 3-methyl-1,5-pentanediol (23.9), ethyl alcohol (23.8), 1-(hydroxymethyl)-5,5-dimethylhydantoin (23.7), triethylene glycol (22.7), a polyethylene glycol having a number-average molecular weight of 200 (18.9), 2-ethyl-1,3-hexanediol (18.5), isopropyl alcohol (18.3), 1,3-bis(2-hydroxyethyl)-5,5-dimethylhydantoin (16.0), 1,2-hexanediol (14.8), and a polyethylene glycol having a number-average molecular weight of 600 (11.4) (figures in parentheses are relative dielectric constants at 25° C.). The first water-soluble organic solvent can have a lower vapor pressure than water at a temperature of 25° C.

The ratio of the first water-soluble organic solvent content S (% by mass) to the pigment content P (% by mass) of the aqueous ink is 2.0 or more to 10.0 or less. A mass ratio of less than 2.0 or more than 10.0 results in a decrease in intermittent ejection stability during the use of the recording apparatus for extended periods. The first water-soluble organic solvent content S (% by mass) of the aqueous ink is preferably 3.0% or more to 50.0% or less by mass, more preferably 5.0% or more to 35.0% or less by mass, of the total mass of the ink.

Resin

The aqueous ink can contain a resin. The resin in the aqueous ink may be dissolved in an aqueous medium or may be dispersed as resin particles in an aqueous medium. The term "water-soluble resin", as used herein, means that the resin neutralized with an alkali in an amount equivalent to the acid value of the resin does not form particles having a size measurable, for example, by a dynamic light scattering method. The resin preferably has an acid value of 40 mgKOH/g or more. The water-soluble resin may have an anionic group that forms a salt. Examples of cations that can form salts include, but are not limited to, alkali metal cations, such as lithium, sodium, and potassium; ammonium ion ($NH_4$); and cations of organic ammoniums, such as dimethylamine and triethanolamine. The upper limit of the acid value of the resin is preferably 300 mgKOH/g or less. If the resin is an acrylic resin, the acid value of the resin is preferably 250 mgKOH/g or less, more preferably 240 mgKOH/g or less. If the resin is a urethane resin, the acid value of the resin is preferably 200 mgKOH/g or less, more preferably 160 mgKOH/g or less.

Examples of the resin include, but are not limited to, acrylic resins, polyester resins, urethane resins, urea resins, polysaccharides, and polypeptides. Acrylic resins and urethane resins can provide good ejection characteristics of the recording head. A resin component in the form of particles tends to hold bubbles. Thus, the aqueous ink should not contain an excess amount of such a resin component.

Compound Represented by General Formula (I)

The present inventors have studied a method for more effectively reducing the decrease in intermittent ejection stability by preventing pigment aggregation even when sedimentation significantly increases the pigment concentration. It was found that prevention of pigment aggregation requires the pigment to come closer to water molecules, and this is achieved by making the pigment closer to water molecules of the main liquid medium of the aqueous ink. The present inventors have searched for a material that can achieve this and have found that a compound represented by the general formula (I) described later is effective.

The compound represented by the general formula (I) includes "—C(=O)—N(—$R_1$)—C(=O)—N(—$R_2$)—" and "—C(—$R_3$)$_2$—" in its structure. The former structure has hydrogen bonding ability, and the latter structure has relatively high hydrophobicity. Thus, the compound represented by the general formula (I) induces the following interactions in the ink. The "—C(—$R_3$)$_2$—" moiety of the compound represented by the general formula (I) has a hydrophobic interaction with pigment. The "—C(=O)—N(—$R_1$)—C(=O)—N(—$R_2$)—" moiety of the compound represented by the general formula (I) has a hydrogen bonding interaction with water molecules. These interactions bring water molecules and pigment closer together in the ink via the compound represented by the general formula (I). Thus, even in the case where pigment is easily aggregated as described above, pigment aggregation can be effectively suppressed, and the decrease in intermittent ejection stability can be more effectively reduced.

The aqueous ink can contain a compound represented by the following general formula (I). The amount of the compound represented by the general formula (I) (% by mass) in the ink is preferably 0.1% or more to 15.0% or less by mass, more preferably 0.5% or more to 10.0% or less by mass, of the total mass of the ink.

[Chem. 2]

(I)

In general formula (I), $R_1$ and $R_2$ each independently represents a hydrogen atom or a hydroxyalkyl group, and each $R_3$s independently represents a hydrogen atom or an alkyl group.

The hydroxyalkyl group of $R_1$ and $R_2$ preferably has 1 to 5, more preferably 1 to 3, carbon atoms. The hydroxyalkyl group of $R_1$ and $R_2$ may be a hydroxymethyl, hydroxyethyl, hydroxy n-propyl, hydroxy isopropyl, hydroxy n-butyl, hydroxy isobutyl, or hydroxypentyl group. In particular, the hydroxyalkyl group of $R_1$ and $R_2$ may be a hydroxymethyl or hydroxyethyl group. The alkyl group of $R_3$ preferably has 1 to 3 carbon atoms. The alkyl group of $R_3$ may be a methyl, ethyl, or n-propyl group. In particular, the alkyl group of $R_3$ may be a methyl group.

The compound represented by the general formula (I) may be 1-hydroxymethyl-5,5-dimethylhydantoin, 3-(hydroxymethyl)-5,5-dimethylhydantoin, 3-(2-hydroxyethyl)-5,5-dimethylhydantoin, or 1,3-bis(2-hydroxyethyl)-5,5-dimethylhydantoin. As a matter of course, any compound having the structure represented by the general formula (I) and covered by the definition may be used in the present invention. Among the compounds represented by the general formula (I), 1,3-bis(2-hydroxyethyl)-5,5-dimethylhydantoin may be used. This compound has a relative dielectric constant of 10.0 or more to 30.0 or less, can efficiently induce the interaction between pigment and water molecules because of its molecular structure, and can thereby particularly efficiently reduce the decrease in intermittent ejection stability.

Aqueous Medium

The aqueous ink can contain an aqueous medium containing water and a water-soluble organic solvent. The water can be deionized water or ion-exchanged water. The water content (% by mass) of the aqueous ink is preferably 50.0% or more to 95.0% or less by mass of the total mass of the ink.

The water-soluble organic solvent is at least a first water-soluble organic solvent having a relative dielectric constant of 10.0 or more to 30.0 or less at a temperature of 25° C. The first water-soluble organic solvent can be used in combination with a water-soluble organic solvent having a relative dielectric constant of less than 10.0 or more than 30.0 at a temperature of 25° C. (referred to as a second water-soluble organic solvent, for convenience). The second water-soluble organic solvent may be one or two or more of water-soluble organic solvents for use in ink jet inks. The water-soluble organic solvent content (% by mass) of the aqueous ink is preferably 3.0% or more to 50.0% or less by mass of the total mass of the ink. This content includes the amounts of the first water-soluble organic solvent and an optional compound represented by the general formula (I).

Examples of the water-soluble organic solvent include, but are not limited to, the following water-soluble organic solvents, including the first water-soluble organic solvents described above (figures in parentheses are relative dielectric constants at 25° C.): monovalent alcohols having 1 to 4 carbon atoms, such as methyl alcohol (33.1), ethyl alcohol (23.8), n-propyl alcohol, isopropyl alcohol (18.3), n-butyl alcohol, sec-butyl alcohol, and tert-butyl alcohol; dihydric alcohols, such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), 3-methyl-1,3-butanediol (24.0), 3-methyl-1,5-pentanediol (23.9), and 2-ethyl-1,3-hexanediol (18.5); polyhydric alcohols, such as 1,2,6-hexanetriol (28.5), glycerin (42.3), trimethylolpropane (33.7), and trimethylolethane; alkylene glycols, such as ethylene glycol (40.4), diethylene glycol (31.7), triethylene glycol (22.7), tetraethylene glycol, butylene glycol, hexylene glycol, and thiodiglycol; glycol ethers, such as diethylene glycol monomethyl ether, diethylene glycol monoethyl ether, triethylene glycol monoethyl ether, and triethylene glycol monobutyl ether (9.8); polyalkylene glycols, such as a polyethylene glycol having a number-average molecular weight of 200 (18.9), a polyethylene glycol having a number-average molecular weight of 600 (11.4), a polyethylene glycol having a number-average molecular weight of 1,000 (4.6), and a polypropylene glycol having a number-average molecular weight in the range of 200 to 1,000; nitrogen-containing compounds, such as 2-pyrrolidone (28.0), N-methyl-2-pyrrolidone (32.0), 1-(2-hydroxyethyl)-2-pyrrolidone (37.6), 1,3-dimethyl-2-imidazolidinone, N-methylmorpholine, urea (110.3), ethyleneurea (49.7), triethanolamine (31.9), 1-hydroxymethyl-5,5-dimethylhydantoin (23.7), and 1,3-bis(2-hydroxyethyl)-5,5-dimethylhydantoin (16.0); sulfur-containing compounds, such as dimethyl sulfoxide (48.9) and bis(2-hydroxyethylsulfone); and cyclic ethers, such as γ-butyrolactone (41.9). The water-soluble organic solvent other than the first water-soluble organic solvent contained in the ink can have a relative dielectric constant of 3.0 or more and/or a lower vapor pressure than water at 25° C.

Other Components

In order to produce an aqueous ink having desired physical properties, the aqueous ink may contain various additive agents, such as an antifoaming agent, a pH adjuster, a preservative, a fungicide, an antioxidant, and/or a reducing inhibitor, if necessary.

Viscosity

From the perspective of ink supply from the main tank to the sub tank and from the sub tank to the recording head, the viscosity $\eta_A$ (mPa·s) of the ink at the temperature $T_A$ (25° C.) is preferably 1.0 mPa·s or more to 10.0 mPa·s or less, more preferably 1.5 mPa·s or more to 6.0 mPa·s or less, particularly preferably 2.0 mPa·s or more to 4.0 mPa·s or less. When the ink is ejected, the ink can have a viscosity $\eta_B$ (mPa·s) at the temperature $T_B$ (° C.) such that the ratio $\eta_B/\eta_A$ is 0.8 or less, for example, preferably 0.5 mPa·s or more to 8.0 mPa·s or less, more preferably 0.8 mPa·s or more to 4.5 mPa·s or less, particularly preferably 1.0 mPa·s or more to 3.0 mPa·s or less.

An aqueous ink according to an embodiment of the present invention is used in an ink jet system. The physical properties of the aqueous ink can be appropriately adjusted for the ink jet system. More specifically, the ink preferably has a surface tension of 25 mN/m or more to 45 mN/m or less at 25° C. The ink preferably has a pH of 5.0 or more to 10.0 or less, more preferably 7.0 or more to 9.0 or less, at 25° C.

EXAMPLES

Although the present invention is further described below in the Examples and comparative examples, the present invention is not limited to these Examples within the gist of the present invention. Unless otherwise specified, "part" and "%" with respect to the amount of component are based on mass.

<Preparation of Pigment Dispersion Liquid>

Pigment Dispersion Liquid 1

A mixture of 500 g of ion-exchanged water and 15.0 g of a pigment (carbon black, "Black Pearls 880" (trade name), manufactured by Cabot Corporation) was agitated at a rotational speed of 15,000 rpm for 30 minutes for pre-wetting of the pigment. After 4,485 g of ion-exchanged water was added to the mixture, the mixture was dispersed in a high-pressure homogenizer to prepare a dispersion liquid. The dispersion liquid was transferred to a pressure vessel. Ozone water having an ozone concentration of 100 ppm was introduced into the pressure vessel at a pressure of 3.0 MPa. The pigment was subjected to oxidation treatment. The mixture was removed from the pressure vessel. The pH of the mixture was adjusted to 10.0 by the addition of aqueous sodium hydroxide. A proper amount of ion-exchanged water was added to the mixture to adjust the pigment content. Thus, a pigment dispersion liquid 1 was prepared. The pigment dispersion liquid 1 contained a self-dispersible pigment. A carboxylic acid group having a sodium counter ion was directly bonded to the surface of the particles of the self-dispersible pigment. The pigment content was 10.0%.

Pigment Dispersion Liquid 2

A solution of 70.6 mmol of concentrated hydrochloric acid in 5.5 g of water was cooled to a temperature of 5° C. To the solution was added 9.8 mmol of 4-aminophthalic acid. The solution in a container was agitated in an ice bath and was kept at 10° C. or less. To the solution was added a solution of 24.9 mmol of sodium nitrite in 9.0 g of 5° C. water. After agitation for another 15 minutes, 6.0 g of a pigment was added to the solution under agitation. The pigment was carbon black ("Black Pearls 880" (trade name), manufactured by Cabot Corporation). After agitation for another 15 minutes, a slurry was obtained. The slurry was passed through a filter paper ("standard filter paper No. 2" (trade name), manufactured by Advantec Toyo Kaisha, Ltd.), was sufficiently washed with water, and was dried in an oven at a temperature of 110° C., thus producing a self-dispersible pigment. The pigment content was adjusted with ion-exchanged water. Thus, a pigment dispersion liquid 2 was obtained. The pigment dispersion liquid 2 contained a self-dispersible pigment. A phthalic acid group having a sodium counter ion was bonded to the surface of the particles of the self-dispersible pigment. The pigment content was 10.0%.

Pigment Dispersion Liquid 3

7.0 g of a pigment, 14.0 mmol of monosodium ((4-aminobenzoylamino)-methane-1,1-diyl) bisphosphonate, 40.0 mmol of nitric acid, and 200.0 mL of pure water were mixed. C.I. Pigment Blue 15:3 was used as a pigment. Mixing was performed at 6,000 rpm with a Silverson mixer at room temperature. After 30 minutes, 40.0 mmol of sodium nitrite dissolved in a small amount of water was slowly added to the mixture. The addition of the sodium nitrite increased the temperature of the mixture to 60° C. Under this condition, the mixture was allowed to react for one hour. The pH of the mixture was adjusted to 10 with aqueous sodium hydroxide. After 30 minutes, 20.0 mL of pure water was added to the mixture. The mixture was subjected to diafiltration with a Spectrum membrane. The pigment content was adjusted with ion-exchanged water. Thus, a pigment dispersion liquid 3 was obtained. The pigment dispersion liquid 3 contained a self-dispersible pigment. A ((benzoylamino)-methane-1,1-diyl)bisphosphonate group having a sodium counter ion was bonded to the surface of the particles of the self-dispersible pigment. The pigment content was 10.0%.

Pigment Dispersion Liquid 4

A pigment dispersion liquid 4 was produced in the same manner as the pigment dispersion liquid 3 except that the pigment was C.I. Pigment Red 122. The pigment dispersion liquid 4 contained a self-dispersible pigment. A ((benzoylamino)-methane-1,1-diyl)bisphosphonate group having a sodium counter ion was bonded to the surface of the particles of the self-dispersible pigment. The pigment content was 10.0%.

Pigment Dispersion Liquid 5

A pigment dispersion liquid 5 was produced in the same manner as the pigment dispersion liquid 3 except that the pigment was C.I. Pigment Yellow 74. The pigment dispersion liquid 5 contained a self-dispersible pigment. A ((benzoylamino)-methane-1,1-diyl)bisphosphonate group having a sodium counter ion was bonded to the surface of the particles of the self-dispersible pigment. The pigment content was 10.0%.

Pigment Dispersion Liquid 6

A mixture of 10.0 parts of a pigment, 20.0 parts of an aqueous solution of a resin dispersant (resin (solid) content: 20.0%), and 70.0 parts of ion-exchanged water was prepared. The pigment was carbon black ("Black Pearls 880" (trade name), manufactured by Cabot Corporation). The aqueous solution of the resin dispersant was a water-soluble resin of a styrene-acrylic acid copolymer (weight-average molecular weight: 10,000, acid value: 200 mgKOH/g) dissolved in ion-exchanged water using sodium hydroxide in an amount equivalent to the acid value. The mixture was dispersed in a batch-type vertical sand mill for three hours and was then pressed through a microfilter having a pore size of 1.2 μm (manufactured by Fujifilm Corporation). The pigment content was then adjusted with ion-exchanged water. Thus, a pigment dispersion liquid 6 was obtained. The pigment dispersion liquid 6 contained the pigment dispersed in the water-soluble resin (resin dispersant). The pigment content was 10.0%, and the water-soluble resin content was 4.0%.

Pigment Dispersion Liquid 7

A pigment dispersion liquid 7 was produced in the same manner as the pigment dispersion liquid 6 except that the pigment was C.I. Pigment Blue 15:3. The pigment dispersion liquid 7 contained the pigment dispersed in the water-soluble resin (resin dispersant). The pigment content was 10.0%, and the water-soluble resin content was 4.0%.

Pigment Dispersion Liquid 8

A pigment dispersion liquid 8 was produced in the same manner as the pigment dispersion liquid 6 except that the pigment was C.I. Pigment Red 122. The pigment dispersion liquid 8 contained the pigment dispersed in the water-soluble resin (resin dispersant). The pigment content was 10.0%, and the water-soluble resin content was 4.0%.

Pigment Dispersion Liquid 9

A pigment dispersion liquid 9 was produced in the same manner as the pigment dispersion liquid 6 except that the pigment was C.I. Pigment Yellow 74. The pigment dispersion liquid 9 contained the pigment dispersed in the water-soluble resin (resin dispersant). The pigment content was 10.0%, and the water-soluble resin content was 4.0%.

<Preparation of Ink>

The components (unit: %) in the upper rows of Tables 1 to 4 were sufficiently mixed and were pressed through a microfilter having a pore size of 3.0 m (manufactured by Fujifilm Corporation) to prepare inks. 1,3-bis(2-hydroxyethyl)-5,5-dimethylhydantoin was used as a compound represented by the general formula (I). A polyethylene glycol having a number-average molecular weight of 600 was used. Uniox G-1200 (trade name) is an ethylene oxide adduct of glycerin manufactured by NOF Corporation. Acetylenol E100 (trade name) is an ethylene oxide adduct of acetylene glycol manufactured by Kawaken Fine Chemicals Co., Ltd. Surfynol 465 (trade name) is an ethylene oxide adduct of acetylene glycol manufactured by Nissin Chemical Industry Co., Ltd.

The relative dielectric constant of the water-soluble organic solvent in the parentheses was measured with a dielectric constant meter ("BI-870" (trade name), manufactured by Brookhaven Instruments Corporation) at a frequency of 1 kHz. The relative dielectric constant of a water-soluble organic solvent that is solid at a temperature of 25° C. was calculated using the formula (1). The lower rows of Tables 1 to 4 list the pigment content P (%) of the ink, the first water-soluble organic solvent ("first solvent") content S (%) of the ink, S/P (times), and the viscosity $\eta_A$ (mPa·s) of the ink at a temperature of 25° C. The viscosity $\eta_A$ (mPa·s) of the ink at a temperature of 25° C. was measured with an E-type viscometer (RE-85L, manufactured by Toki Sangyo Co., Ltd.).

TABLE 1

Compositions and characteristics of inks

| | Ink No. | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid 1 | 30.0 | 30.0 | 30.0 | 30.0 | 30.0 | 30.0 | 30.0 | | | 30.0 | 30.0 |
| Pigment dispersion liquid 2 | | | | | | | | 30.0 | | | |
| Pigment dispersion liquid 3 | | | | | | | | | | | |
| Pigment dispersion liquid 4 | | | | | | | | | | | |
| Pigment dispersion liquid 5 | | | | | | | | | | | |
| Pigment dispersion liquid 6 | | | | | | | | | 30.0 | | |
| Pigment dispersion liquid 7 | | | | | | | | | | | |
| Pigment dispersion liquid 8 | | | | | | | | | | | |
| Pigment dispersion liquid 9 | | | | | | | | | | | |
| Glycerin (42.3) | | 8.0 | 8.0 | 8.0 | | 8.0 | | | | | |
| Diethylene glycol (31.7) | | | | | | | | | | | |
| 1,3-butanediol (30.0) | | | 6.0 | | | | | | | | |
| 2-methyl-1,3-propanediol (28.3) | 2.0 | | | | | | 1.0 | 2.0 | 2.0 | 2.0 | 2.0 |
| 2-pyrrolidone (28.0) | 8.0 | | | 6.0 | 10.0 | | 8.0 | 8.0 | 8.0 | 8.0 | 8.0 |
| 1,5-pentanediol (27.0) | 4.0 | | | | 5.0 | | 4.0 | 4.0 | 4.0 | 4.0 | 4.0 |
| 3-methyl-1,5-pentanediol (23.9) | | | | | | | | | | | |
| Triethylene glycol (22.7) | | | | | 10.0 | | | | | | |
| Compound represented by general formula (I) (16.0) | | | | | | | | | | | |
| Polyethylene glycol (11.4) | | 6.0 | | | 5.0 | 6.0 | | | | | |
| Triethylene glycol monobutyl ether (9.8) | | | | | | | | | | | |
| 1,6-hexanediol (7.1) | | | | | | | | | | | |
| Uniox G-1200 | 0.2 | 0.2 | 0.2 | 0.2 | 0.2 | 0.2 | 0.2 | 0.2 | 0.2 | | |
| Acetylenol E100 | | | | | | | | | | 0.2 | |
| Surfynol 465 | | | | | | | | | | | 0.2 |
| Ion-exchanged water | 55.8 | 55.8 | 55.8 | 55.8 | 39.8 | 55.8 | 56.8 | 55.8 | 55.8 | 55.8 | 55.8 |
| Pigment content P (%) | 3.0 | 3.0 | 3.0 | 3.0 | 3.0 | 3.0 | 3.0 | 3.0 | 3.0 | 3.0 | 3.0 |
| First solvent content S (%) | 14.0 | 6.0 | 6.0 | 6.0 | 30.0 | 6.0 | 13.0 | 14.0 | 14.0 | 14.0 | 14.0 |
| S/P (times) | 4.7 | 2.0 | 2.0 | 2.0 | 10.0 | 2.0 | 4.3 | 4.7 | 4.7 | 4.7 | 4.7 |
| Ink viscosity at 25° C. $\eta_A$ (mPa·s) | 2.6 | 3.2 | 2.6 | 2.5 | 3.6 | 3.2 | 2.5 | 2.5 | 3.0 | 2.6 | 2.5 |

TABLE 2

Compositions and characteristics of inks

| | Ink No. | | | | | | | | | | |
|---|---|---|---|---|---|---|---|---|---|---|---|
| | 12 | 13 | 14 | 15 | 16 | 17 | 18 | 19 | 20 | 21 | 22 |
| Pigment dispersion liquid 1 | 30.0 | | | | | | | | | | |
| Pigment dispersion liquid 2 | | | | | | | | | | | |
| Pigment dispersion liquid 3 | | | 30.0 | 30.0 | 30.0 | 30.0 | 30.0 | 30.0 | | | |
| Pigment dispersion liquid 4 | | | | | | | | | 30.0 | | |
| Pigment dispersion liquid 5 | | | | | | | | | | 30.0 | |
| Pigment dispersion liquid 6 | | 30.0 | | | | | | | | | |
| Pigment dispersion liquid 7 | | | | | | | | | | | 30.0 |
| Pigment dispersion liquid 8 | | | | | | | | | | | |
| Pigment dispersion liquid 9 | | | | | | | | | | | |
| Glycerin (42.3) | | 8.0 | | 8.0 | 8.0 | 8.0 | | | | | |
| Diethylene glycol (31.7) | | | | | | | | | | | |
| 1,3-butanediol (30.0) | | | | | 6.0 | | | | | | |
| 2-methyl-1,3-propanediol (28.3) | 2.0 | | 2.0 | | | | 1.0 | 2.0 | 2.0 | 2.0 | 2.0 |
| 2-pyrrolidone (28.0) | | | 8.0 | | | 6.0 | 10.0 | 8.0 | 8.0 | 8.0 | 8.0 |
| 1,5-pentanediol (27.0) | 4.0 | | 4.0 | | | | 5.0 | 4.0 | 4.0 | 4.0 | 4.0 |
| 3-methyl-1,5-pentanediol (23.9) | | | | | | | | | | | |
| Triethylene glycol (22.7) | | | | | | | 10.0 | | | | |
| Compound represented by general formula (I) (16.0) | 8.0 | | | | | | | | | | |
| Polyethylene glycol (11.4) | | 6.0 | | 6.0 | | | 5.0 | | | | |
| Triethylene glycol monobutyl ether (9.8) | | | | | | | | | | | |
| 1,6-hexanediol (7.1) | | | | | | | | | | | |
| Uniox G-1200 | 0.2 | 0.2 | 0.2 | 0.2 | 0.2 | 0.2 | 0.2 | 0.2 | 0.2 | 0.2 | 0.2 |
| Acetylenol E100 | | | | | | | | | | | |
| Surfynol 465 | | | | | | | | | | | |
| Ion-exchanged water | 55.8 | 55.8 | 55.8 | 55.8 | 55.8 | 55.8 | 39.8 | 56.8 | 55.8 | 55.8 | 55.8 |
| Pigment content P (%) | 3.0 | 3.0 | 3.0 | 3.0 | 3.0 | 3.0 | 3.0 | 3.0 | 3.0 | 3.0 | 3.0 |
| First solvent content S (%) | 14.0 | 6.0 | 14.0 | 6.0 | 6.0 | 6.0 | 30.0 | 13.0 | 14.0 | 14.0 | 14.0 |
| S/P (times) | 4.7 | 2.0 | 4.7 | 2.0 | 2.0 | 2.0 | 10.0 | 4.3 | 4.7 | 4.7 | 4.7 |
| Ink viscosity at 25° C. $\eta_A$ (mPa·s) | 2.8 | 3.2 | 2.7 | 3.3 | 2.7 | 2.6 | 3.7 | 2.6 | 2.8 | 2.7 | 3.2 |

TABLE 3

Compositions and characteristics of inks

| | Ink No. | | | | | | | | | | |
|---|---|---|---|---|---|---|---|---|---|---|---|
| | 23 | 24 | 25 | 26 | 27 | 28 | 29 | 30 | 31 | 32 | 33 |
| Pigment dispersion liquid 1 | | | | | | | | 30.0 | | 30.0 | |
| Pigment dispersion liquid 2 | | | | | | | | | | | |
| Pigment dispersion liquid 3 | | | 30.0 | 30.0 | 30.0 | | | | 30.0 | | 30.0 |
| Pigment dispersion liquid 4 | | | | | | | | | | | |
| Pigment dispersion liquid 5 | | | | | | | | | | | |
| Pigment dispersion liquid 6 | | | | | | | | | | | |
| Pigment dispersion liquid 7 | | | | | | 30.0 | 30.0 | | | | |
| Pigment dispersion liquid 8 | 30.0 | | | | | | | | | | |
| Pigment dispersion liquid 9 | | 30.0 | | | | | | | | | |
| Glycerin (42.3) | | | | | | | | 8.0 | 8.0 | 8.0 | 8.0 |
| Diethylene glycol (31.7) | | | | | | | | | | 6.0 | 6.0 |
| 1,3-butanediol (30.0) | | | | | | | | | | | |
| 2-methyl-1,3-propanediol (28.3) | 2.0 | 2.0 | 2.0 | 2.0 | 2.0 | | | | | | |
| 2-pyrrolidone (28.0) | 8.0 | 8.0 | 8.0 | 8.0 | | | | | | | |
| 1,5-pentanediol (27.0) | 4.0 | 4.0 | 4.0 | 4.0 | 4.0 | | | | | | |
| 3-methyl-1,5-pentanediol (23.9) | | | | | | | | | | | |
| Triethylene glycol (22.7) | | | | | | | | | | | |
| Compound represented by general formula (I) (16.0) | | | | | 8.0 | | | | | | |
| Polyethylene glycol (11.4) | | | | | | 6.0 | 6.0 | | | | |
| Triethylene glycol monobutyl ether (9.8) | | | | | | | | 3.0 | 3.0 | | |
| 1,6-hexanediol (7.1) | | | | | | | | 3.0 | 3.0 | | |
| Uniox G-1200 | 0.2 | 0.2 | | | 0.2 | 0.2 | 0.2 | 0.2 | 0.2 | 0.2 | 0.2 |
| Acetylenol E100 | | | 0.2 | | | | | | | | |
| Surfynol 465 | | | | 0.2 | | | | | | | |
| Ion-exchanged water | 55.8 | 55.8 | 55.8 | 55.8 | 55.8 | 63.8 | 63.8 | 55.8 | 55.8 | 55.8 | 55.8 |
| Pigment content P (%) | 3.0 | 3.0 | 3.0 | 3.0 | 3.0 | 3.0 | 3.0 | 3.0 | 3.0 | 3.0 | 3.0 |
| First solvent content S (%) | 14.0 | 14.0 | 14.0 | 14.0 | 14.0 | 6.0 | 6.0 | 0.0 | 0.0 | 0.0 | 0.0 |
| S/P (times) | 4.7 | 4.7 | 4.7 | 4.7 | 4.7 | 2.0 | 2.0 | 0.0 | 0.0 | 0.0 | 0.0 |
| Ink viscosity at 25° C. $\eta_A$ (mPa · s) | 3.4 | 3.1 | 2.7 | 2.6 | 3.1 | 3.3 | 3.3 | 2.8 | 2.9 | 2.6 | 2.7 |

TABLE 4

Compositions and characteristics of inks

| | Ink No. | | | | | | | | |
|---|---|---|---|---|---|---|---|---|---|
| | 34 | 35 | 36 | 37 | 38 | 39 | 40 | 41 | 42 |
| Pigment dispersion liquid 1 | 30.0 | | 30.0 | | 30.0 | | 30.0 | | 30.0 |
| Pigment dispersion liquid 2 | | | | | | | | | |
| Pigment dispersion liquid 3 | | 30.0 | | 30.0 | | 30.0 | | 30.0 | |
| Pigment dispersion liquid 4 | | | | | | | | | |
| Pigment dispersion liquid 5 | | | | | | | | | |
| Pigment dispersion liquid 6 | | | | | | | | | |
| Pigment dispersion liquid 7 | | | | | | | | | |
| Pigment dispersion liquid 8 | | | | | | | | | |
| Pigment dispersion liquid 9 | | | | | | | | | |
| Glycerin (42.3) | 9.0 | 9.0 | | | | | | | 6.0 |
| Diethylene glycol (31.7) | | | | | | | | | |
| 1,3-butanediol (30.0) | | | | | | | | | |
| 2-methyl-1,3-propanediol (28.3) | | | | | 2.0 | 2.0 | 2.0 | 2.0 | |
| 2-pyrrolidone (28.0) | 5.0 | 5.0 | 12.0 | 12.0 | 8.0 | 8.0 | 8.0 | 8.0 | 10.0 |
| 1,5-pentanediol (27.0) | | | 5.0 | 5.0 | 4.0 | 4.0 | 4.0 | 4.0 | |
| 3-methyl-1,5-pentanediol (23.9) | | | | | | | | | 11.0 |
| Triethylene glycol (22.7) | | | 10.0 | 10.0 | | | | | |
| Compound represented by general formula (I) (16.0) | | | | | | | | | |
| Polyethylene glycol (11.4) | | | 5.0 | 5.0 | | | | | |
| Triethylene glycol monobutyl ether (9.8) | | | | | | | | | |
| 1,6-hexanediol (7.1) | | | | | | | | | |
| Uniox G-1200 | 0.2 | 0.2 | 0.2 | 0.2 | 0.2 | 0.2 | 0.2 | 0.2 | |
| Acetylenol E100 | | | | | | | | | 0.6 |
| Surfynol 465 | | | | | | | | | |
| Ion-exchanged water | 55.8 | 55.8 | 37.8 | 37.8 | 55.8 | 55.8 | 55.8 | 55.8 | 42.4 |
| Pigment content P (%) | 3.0 | 3.0 | 3.0 | 3.0 | 3.0 | 3.0 | 3.0 | 3.0 | 3.0 |
| First solvent content S (%) | 5.0 | 5.0 | 32.0 | 32.0 | 14.0 | 14.0 | 14.0 | 14.0 | 21.0 |
| S/P (times) | 1.7 | 1.7 | 10.7 | 10.7 | 4.7 | 4.70 | 4.7 | 4.7 | 7.0 |
| Ink viscosity at 25° C. $\eta_A$ (mPa · s) | 2.6 | 2.7 | 3.7 | 3.8 | 2.6 | 2.7 | 2.6 | 2.7 | 3.2 |

<Evaluation>

For evaluation, a main tank, a sub tank, and a recording head illustrated in FIG. 2 were installed in an ink jet recording apparatus including a main portion illustrated in FIG. 1. The sub tank included a thermoplastic resin housing bonded to a recording element substrate, which included a recording head for ejecting ink by thermal energy. Tables 5 and 6 list the maximum ink storage amount of the main tank ("Storage amount of main tank $V_1$") and the maximum ink storage amount of the sub tank ("Storage amount of sub tank $V_2$"). The main tank was filled with the ink up to 95% of the maximum ink storage amount.

The temperature $T_B$ (° C.) of the ink in the recording head was adjusted by utilizing thermal energy generated by the recording head bonded to the housing of the sub tank and was listed in Tables 5 and 6. The viscosity $\eta_B$ (mPa·s) of the ink at the temperature $T_B$ (° C.) was measured in an airtight container at the temperature $T_B$ (° C.) using the above viscometer.

In the present Examples, the recording duty of a solid image recorded with two ink droplets per unit area of 1/600 inches×1/600 inches was defined as 100%. Each of the droplets had a mass of 5 ng. A solid image was recorded at a relative humidity of 10% and at a recording duty of 5% over the entire surface of ten A4-size plain paper copier (PPC) paper sheets ("GF-500" (trade name), manufactured by CANON KABUSHIKI KAISHA). Recording was then stopped for 90 seconds. This operation cycle was repeatedly performed up to 5,000 paper sheets. When the solid image was recorded on 3,000 paper sheets and 5,000 paper sheets, recording was stopped for 5 seconds, and a vertical rule was recorded on a coated paper sheet ("HR-101" (trade name), manufactured by CANON KABUSHIKI KAISHA) without recovery of the recording head.

The vertical rules recorded after the solid image was recorded on 3,000 paper sheets and 5,000 paper sheets were visually inspected and examined with a magnifier having a magnification of 10. The ejection properties were rated according to the following evaluation criteria. In the present invention, the ratings "AAA", "AA", "A", and "B" were acceptable, and "C" was unacceptable. Tables 5 and 6 show the evaluation results.

In the evaluation, the number of recorded sheets was increased to extend the elapsed time from the beginning of the evaluation. This is because a long storage time of the ink in the main tank promotes sedimentation of pigment in the ink in the main tank. Observation of no irregularities in the vertical rule even after recording on a large number of sheets indicates that the present invention can reduce the decrease in intermittent ejection stability caused by precipitated pigment. In contrast, irregularities in the vertical rule indicate that sedimentation of pigment in the ink impeded normal ink ejection.

AAA: No irregularities were observed visually or with the magnifier on the vertical rule recorded after the solid image was recorded on 5,000 paper sheets.

AA: Irregularities were not visually observed but were observed with the magnifier on the vertical rule recorded after the solid image was recorded on 5,000 paper sheets.

A: Although irregularities were visually observed on the vertical rule recorded after the solid image was recorded on 5,000 paper sheets, no irregularities were observed visually or with the magnifier on the vertical rule recorded after the solid image was recorded on 3,000 paper sheets.

B: Irregularities were not visually observed but were observed with the magnifier on the vertical rule recorded after the solid image was recorded on 3,000 paper sheets.

C: Irregularities were visually observed on the vertical rule recorded after the solid image was recorded on 3,000 paper sheets.

TABLE 5

Evaluation results

| | | Ink No. | Storage amount of main tank $V_1$ (mL) | Storage amount of sub tank $V_2$ (mL) | $V_1/V_2$ ratio (times) | Main tank height H (cm) | Main tank base area S (cm$^2$) | H/S (cm$^{-1}$) | Ink temperature $T_B$ (° C.) | Ink viscosity at $T_B$° C. $\eta_B$ (mPa·s) | $\eta_B/\eta_A$ (times) | Evaluation results (intermittent ejection stability) |
|---|---|---|---|---|---|---|---|---|---|---|---|---|
| Example | 1 | 1 | 90.0 | 18.0 | 5.0 | 10.0 | 9.0 | 1.1 | 60.0 | 1.4 | 0.5 | AAA |
| | 2 | 1 | 100.0 | 20.0 | 5.0 | 10.0 | 10.0 | 1.0 | 60.0 | 1.4 | 0.5 | AAA |
| | 3 | 1 | 162.0 | 20.0 | 8.1 | 13.5 | 12.0 | 1.1 | 60.0 | 1.4 | 0.5 | AAA |
| | 4 | 1 | 90.0 | 30.0 | 3.0 | 10.0 | 9.0 | 1.1 | 60.0 | 1.4 | 0.5 | AA |
| | 5 | 1 | 90.0 | 9.0 | 10.0 | 10.0 | 9.0 | 1.1 | 60.0 | 1.4 | 0.5 | AAA |
| | 6 | 1 | 90.0 | 2.25 | 40.0 | 10.0 | 9.0 | 1.1 | 60.0 | 1.4 | 0.5 | AAA |
| | 7 | 1 | 90.0 | 2.2 | 40.9 | 10.0 | 9.0 | 1.1 | 60.0 | 1.4 | 0.5 | AA |
| | 8 | 1 | 90.0 | 1.8 | 50.0 | 10.0 | 9.0 | 1.1 | 60.0 | 1.4 | 0.5 | AA |
| | 9 | 2 | 90.0 | 18.0 | 5.0 | 10.0 | 9.0 | 1.1 | 60.0 | 1.6 | 0.5 | AAA |
| | 10 | 3 | 90.0 | 18.0 | 5.0 | 10.0 | 9.0 | 1.1 | 60.0 | 1.4 | 0.5 | AAA |
| | 11 | 4 | 90.0 | 18.0 | 5.0 | 10.0 | 9.0 | 1.1 | 60.0 | 1.3 | 0.5 | AAA |
| | 12 | 5 | 90.0 | 18.0 | 5.0 | 10.0 | 9.0 | 1.1 | 60.0 | 2.0 | 0.6 | AAA |
| | 13 | 1 | 90.0 | 18.0 | 5.0 | 10.0 | 9.0 | 1.1 | 40.0 | 2.1 | 0.8 | AAA |
| | 14 | 6 | 90.0 | 18.0 | 5.0 | 10.0 | 9.0 | 1.1 | 90.0 | 1.1 | 0.3 | AA |
| | 15 | 7 | 90.0 | 18.0 | 5.0 | 10.0 | 9.0 | 1.1 | 75.0 | 1.1 | 0.4 | AAA |
| | 16 | 8 | 90.0 | 18.0 | 5.0 | 10.0 | 9.0 | 1.1 | 60.0 | 1.3 | 0.5 | AA |
| | 17 | 9 | 90.0 | 18.0 | 5.0 | 10.0 | 9.0 | 1.1 | 60.0 | 1.5 | 0.5 | A |
| | 18 | 1 | 100.0 | 20.0 | 5.0 | 20.0 | 5.0 | 4.0 | 60.0 | 1.4 | 0.5 | AAA |
| | 19 | 1 | 100.0 | 20.0 | 5.0 | 25.0 | 4.0 | 6.3 | 60.0 | 1.4 | 0.5 | AA |
| | 20 | 10 | 90.0 | 18.0 | 5.0 | 10.0 | 9.0 | 1.1 | 60.0 | 1.4 | 0.5 | AAA |
| | 21 | 11 | 90.0 | 18.0 | 5.0 | 10.0 | 9.0 | 1.1 | 60.0 | 1.3 | 0.5 | AAA |
| | 22 | 12 | 90.0 | 18.0 | 5.0 | 10.0 | 9.0 | 1.1 | 60.0 | 1.4 | 0.5 | AAA |
| | 23 | 13 | 90.0 | 1.8 | 50.0 | 25.0 | 4.0 | 6.3 | 90.0 | 1.1 | 0.3 | B |
| | 24 | 13 | 90.0 | 30.0 | 3.0 | 25.0 | 4.0 | 6.3 | 90.0 | 1.1 | 0.3 | B |
| | 25 | 14 | 90.0 | 9.0 | 10.0 | 10.0 | 9.0 | 1.1 | 60.0 | 1.4 | 0.5 | AA |
| | 26 | 14 | 60.0 | 6.0 | 10.0 | 8.0 | 7.5 | 1.1 | 60.0 | 1.4 | 0.5 | AA |
| | 27 | 14 | 80.0 | 12.0 | 6.7 | 9.5 | 8.5 | 1.1 | 60.0 | 1.4 | 0.5 | AA |

TABLE 5-continued

Evaluation results

| | Ink No. | Storage amount of main tank $V_1$ (mL) | Storage amount of sub tank $V_2$ (mL) | $V_1/V_2$ ratio (times) | Main tank height H (cm) | Main tank base area S (cm$^2$) | H/S (cm$^{-1}$) | Ink temperature $T_B$ (° C.) | Ink viscosity at $T_B$° C. $\eta_B$ (mPa·s) | $\eta_B/\eta_A$ (times) | Evaluation results (intermittent ejection stability) |
|---|---|---|---|---|---|---|---|---|---|---|---|
| 28 | 14 | 90.0 | 30.0 | 3.0 | 10.0 | 9.0 | 1.1 | 60.0 | 1.4 | 0.5 | A |
| 29 | 14 | 90.0 | 18.0 | 5.0 | 10.0 | 9.0 | 1.1 | 60.0 | 1.4 | 0.5 | AA |
| 30 | 14 | 90.0 | 2.25 | 40.0 | 10.0 | 9.0 | 1.1 | 60.0 | 1.4 | 0.5 | AA |
| 31 | 14 | 90.0 | 2.0 | 45.0 | 10.0 | 9.0 | 1.1 | 60.0 | 1.4 | 0.5 | A |
| 32 | 14 | 90.0 | 1.8 | 50.0 | 10.0 | 9.0 | 1.1 | 60.0 | 1.4 | 0.5 | A |
| 33 | 15 | 90.0 | 9.0 | 10.0 | 10.0 | 9.0 | 1.1 | 60.0 | 1.7 | 0.5 | AA |
| 34 | 16 | 90.0 | 9.0 | 10.0 | 10.0 | 9.0 | 1.1 | 60.0 | 1.3 | 0.5 | AA |
| 35 | 17 | 90.0 | 9.0 | 10.0 | 10.0 | 9.0 | 1.1 | 60.0 | 1.3 | 0.5 | AA |
| 36 | 18 | 90.0 | 9.0 | 10.0 | 10.0 | 9.0 | 1.1 | 60.0 | 2.0 | 0.5 | AA |
| 37 | 14 | 90.0 | 9.0 | 10.0 | 10.0 | 9.0 | 1.1 | 40.0 | 2.2 | 0.8 | AA |

TABLE 6

Evaluation results

| | | Ink No. | Storage amount of main tank $V_1$ (mL) | Storage amount of sub tank $V_2$ (mL) | $V_1/V_2$ ratio (times) | Main tank height H (cm) | Main tank base area S (cm$^2$) | H/S (cm$^{-1}$) | Ink temperature $T_B$ (° C.) | Ink viscosity at $T_B$° C. $\eta_B$ (mPa·s) | $\eta_B/\eta_A$ (times) | Evaluation results (intermittent ejection stability) |
|---|---|---|---|---|---|---|---|---|---|---|---|---|
| Example | 38 | 15 | 90.0 | 9.0 | 10.0 | 10.0 | 9.0 | 1.1 | 90.0 | 1.1 | 0.3 | A |
| | 39 | 19 | 90.0 | 9.0 | 10.0 | 10.0 | 9.0 | 1.1 | 75.0 | 1.1 | 0.4 | AA |
| | 40 | 20 | 90.0 | 9.0 | 10.0 | 10.0 | 9.0 | 1.1 | 60.0 | 1.4 | 0.5 | AA |
| | 41 | 21 | 90.0 | 9.0 | 10.0 | 10.0 | 9.0 | 1.1 | 60.0 | 1.3 | 0.5 | AA |
| | 42 | 22 | 90.0 | 9.0 | 10.0 | 10.0 | 9.0 | 1.1 | 60.0 | 1.6 | 0.5 | A |
| | 43 | 23 | 90.0 | 9.0 | 10.0 | 10.0 | 9.0 | 1.1 | 60.0 | 1.7 | 0.5 | A |
| | 44 | 24 | 90.0 | 9.0 | 10.0 | 10.0 | 9.0 | 1.1 | 60.0 | 1.6 | 0.5 | A |
| | 45 | 14 | 100.0 | 20.0 | 5.0 | 20.0 | 5.0 | 4.0 | 60.0 | 1.4 | 0.5 | AA |
| | 46 | 14 | 100.0 | 20.0 | 5.0 | 25.0 | 4.0 | 6.3 | 60.0 | 1.4 | 0.5 | A |
| | 47 | 25 | 90.0 | 9.0 | 10.0 | 10.0 | 9.0 | 1.1 | 60.0 | 1.4 | 0.5 | AA |
| | 48 | 26 | 90.0 | 9.0 | 10.0 | 10.0 | 9.0 | 1.1 | 60.0 | 1.3 | 0.5 | AA |
| | 49 | 27 | 90.0 | 9.0 | 10.0 | 10.0 | 9.0 | 1.1 | 60.0 | 1.4 | 0.5 | AA |
| | 50 | 28 | 90.0 | 1.8 | 50.0 | 22.5 | 4.0 | 5.6 | 60.0 | 1.1 | 0.3 | B |
| | 51 | 29 | 90.0 | 30.0 | 3.0 | 22.5 | 4.0 | 5.6 | 60.0 | 1.1 | 0.3 | B |
| Comparative Example | 1 | 30 | 90.0 | 18.0 | 5.0 | 10.0 | 9.0 | 1.1 | 60.0 | 1.5 | 0.5 | C |
| | 2 | 31 | 90.0 | 9.0 | 10.0 | 10.0 | 9.0 | 1.1 | 60.0 | 1.5 | 0.5 | C |
| | 3 | 32 | 90.0 | 18.0 | 5.0 | 10.0 | 9.0 | 1.1 | 60.0 | 1.4 | 0.5 | C |
| | 4 | 33 | 90.0 | 9.0 | 10.0 | 10.0 | 9.0 | 1.1 | 60.0 | 1.4 | 0.5 | C |
| | 5 | 34 | 90.0 | 9.0 | 10.0 | 10.0 | 9.0 | 1.1 | 60.0 | 1.4 | 0.5 | C |
| | 6 | 35 | 90.0 | 9.0 | 10.0 | 10.0 | 9.0 | 1.1 | 60.0 | 1.4 | 0.5 | C |
| | 7 | 36 | 90.0 | 9.0 | 10.0 | 10.0 | 9.0 | 1.1 | 60.0 | 2.1 | 0.6 | C |
| | 8 | 37 | 90.0 | 9.0 | 10.0 | 10.0 | 9.0 | 1.1 | 60.0 | 2.0 | 0.5 | C |
| | 9 | 38 | 90.0 | 18.0 | 5.0 | 10.0 | 9.0 | 1.1 | 25.0 | 2.6 | 1.0 | C |
| | 10 | 39 | 90.0 | 9.0 | 10.0 | 10.0 | 9.0 | 1.1 | 25.0 | 2.7 | 1.0 | C |
| | 11 | 2 | 90.0 | 18.0 | 5.0 | 10.0 | 9.0 | 1.1 | 25.0 | 3.2 | 1.0 | C |
| | 12 | 15 | 90.0 | 9.0 | 10.0 | 10.0 | 9.0 | 1.1 | 25.0 | 3.3 | 1.0 | C |
| | 13 | 3 | 90.0 | 18.0 | 5.0 | 10.0 | 9.0 | 1.1 | 25.0 | 2.6 | 1.0 | C |
| | 14 | 16 | 90.0 | 9.0 | 10.0 | 10.0 | 9.0 | 1.1 | 25.0 | 2.7 | 1.0 | C |
| | 15 | 4 | 90.0 | 18.0 | 5.0 | 10.0 | 9.0 | 1.1 | 25.0 | 2.5 | 1.0 | C |
| | 16 | 17 | 90.0 | 9.0 | 10.0 | 10.0 | 9.0 | 1.1 | 25.0 | 2.6 | 1.0 | C |
| | 17 | 5 | 90.0 | 18.0 | 5.0 | 10.0 | 9.0 | 1.1 | 25.0 | 3.6 | 1.0 | C |
| | 18 | 18 | 90.0 | 9.0 | 10.0 | 10.0 | 9.0 | 1.1 | 25.0 | 3.7 | 1.0 | C |
| | 19 | 40 | 90.0 | 18.0 | 5.0 | 10.0 | 9.0 | 1.1 | 30.0 | 2.4 | 0.9 | C |
| | 20 | 41 | 90.0 | 9.0 | 10.0 | 10.0 | 9.0 | 1.1 | 30.0 | 2.5 | 0.9 | C |
| | 21 | 1 | 90.0 | 45.0 | 2.0 | 10.0 | 9.0 | 1.1 | 60.0 | 1.4 | 0.5 | — |
| | 22 | 1 | 90.0 | 0.9 | 100.0 | 10.0 | 9.0 | 1.1 | 60.0 | 1.4 | 0.5 | — |
| | 23 | 42 | 90.0 | 18.0 | 5.0 | 10.0 | 9.0 | 1.1 | 25.0 | 3.2 | 1.0 | C |

Example 22 was superior to Example 1. Example 49 was superior to Example 25.

The present invention can provide an ink jet recording method for maintaining high intermittent ejection stability even when a recording apparatus having a particular ratio of the ink storage amount of a main tank to the ink storage amount of a sub tank is used for extended periods. The present invention can also provide an ink jet recording apparatus suitable for the ink jet recording method.

While the present invention has been described with reference to examples, it is to be understood that the invention is not limited to the disclosed examples. The scope of the following claims is to be accorded the broadest interpretation so as to encompass all such modifications and equivalent structures and functions.

This application claims the benefit of Japanese Patent Application No. 2015-114030 filed Jun. 4, 2015 and No. 2015-114032 filed Jun. 4, 2015, which are hereby incorporated by reference herein in their entirety.

What is claimed is:

1. An ink jet recording method comprising:
ejecting an aqueous ink from a recording head to record an image on a recording medium using an ink jet recording apparatus, the ink jet recording apparatus comprising:
a first ink storage portion;
a second ink storage portion; and
a recording head,
wherein the first ink storage portion has a maximum ink storage amount ($V_1$) 3.0 or more to 50.0 or less times larger than a maximum ink storage amount ($V_2$) of the second ink storage portion,
wherein the aqueous ink contains a pigment and a first water-soluble organic solvent having a relative dielectric constant of 10.0 or more to 30.0 or less at a temperature of 25° C., and a first water-soluble organic solvent content S (% by mass) is 2.0 or more to 10.0 or less times higher than a pigment content P (% by mass), and
wherein, during the ejecting, the aqueous ink has a temperature at which a ratio of a viscosity of the aqueous ink in the recording head ($\eta_B$) to a viscosity of the aqueous ink at a temperature of 25° C. ($\eta_A$) is 0.8 or less.

2. The ink jet recording method according to claim 1, wherein the ratio of $V_1$ to $V_2$ is 5.0 or more to 40.0 or less.

3. The ink jet recording method according to claim 1, wherein the viscosity ratio is 0.4 or more.

4. The ink jet recording method according to claim 1, wherein the pigment is a self-dispersible pigment.

5. The ink jet recording method according to claim 4, wherein the self-dispersible pigment is a self-dispersible pigment produced by surface oxidation treatment.

6. The ink jet recording method according to claim 1, wherein a ratio of a height H to a base area S of the first ink storage portion is 4.0 or less.

7. The ink jet recording method according to claim 6, wherein the ratio of the height H to the base area S of the first ink storage portion is 0.1 or more.

8. The ink jet recording method according to claim 1, wherein the aqueous ink further contains a compound represented by the following general formula (I):

(I)

wherein $R_1$ and $R_2$ each independently represents a hydrogen atom or a hydroxyalkyl group, and each $R_3$ independently represents a hydrogen atom or an alkyl group.

9. The ink jet recording method according to claim 8, wherein the aqueous ink comprises 0.1% or more to 15.0% or less by mass of the compound represented by general formula (I).

10. The ink jet recording method according to claim 1, wherein, during the ejecting, the aqueous ink has a temperature of 30° C. or more to 90° C. or less.

11. The ink jet recording method according to claim 1, wherein, during the ejecting, the aqueous ink has a temperature of 35° C. or more to 75° C. or less.

12. The ink jet recording method according to claim 1, wherein the pigment content is 0.1% or more to 15.0% or less by mass of the total mass of the ink.

13. The ink jet recording method according to claim 1, wherein the water-soluble organic solvent content is 3.0% or more to 50.0% or less by mass of the total mass of the ink.

14. The ink jet record method according to claim 1, wherein $\eta_A$ is 1.0 mPa·s or more to 10.0 mPa·s or less.

15. The ink jet record method according to claim 1, wherein $\eta_B$ is 0.5 mPa·s or more to 8.0 mPa·s or less.

16. The ink jet recording method according to claim 1, wherein the maximum ink storage amount ($V_1$) is 60.0 mL or more to 200.0 mL or less and the maximum ink storage amount ($V_2$) is 1.0 mL or more to 35.0 mL or less.

17. The ink jet recording method according to claim 1, wherein the ink is supplied from the first ink storage portion to the second ink storage portion through an ink supply tube and is ejected from ejection ports of the recording head.

18. The ink jet recording method according to claim 1, wherein the ink jet recording apparatus is a serial ink jet recording apparatus.

19. The ink jet recording method according to claim 18, wherein the recording head is bonded to the second ink storage portion.

20. The ink jet recording method according to claim 19, wherein the second ink storage portion comprises a thermoplastic resin housing, and
a recording element substrate is directly bonded to the second ink storage portion, the recording element substrate including the recording head.

21. An ink jet recording apparatus comprising:
a first ink storage portion configured to store an aqueous ink;
a second ink storage portion configured to store the aqueous ink; and
a recording head configured to eject the aqueous ink,
wherein the first ink storage portion has a maximum ink storage amount ($V_1$) 3.0 or more to 50.0 or less times larger than a maximum ink storage amount ($V_2$) of the second ink storage portion,
wherein the aqueous ink contains a pigment and a first water-soluble organic solvent having a relative dielectric constant of 10.0 or more to 30.0 or less at a temperature of 25° C., and a first water-soluble organic solvent content S (% by mass) is 2.0 or more to 10.0 or less times higher than a pigment content P (% by mass), and
wherein the aqueous ink has a temperature at which a ratio of a viscosity of the aqueous ink in the recording head ($\eta_B$) to a viscosity of the aqueous ink at a temperature of 25° C. ($\eta_A$) is 0.8 or less.

* * * * *